A. H. WOLFE.
PIPE NIPPLE.
APPLICATION FILED OCT. 1, 1918.

1,326,626.

Patented Dec. 30, 1919.

Witness
M. F. Bergen
S. I. Rogers.

Inventor
Arthur H. Wolfe
By L. B. James
Attorney

UNITED STATES PATENT OFFICE.

ARTHUR HENRY WOLFE, OF MASSENA, NEW YORK.

PIPE-NIPPLE.

1,326,626.    Specification of Letters Patent.    Patented Dec. 30, 1919.

Application filed October 1, 1918. Serial No. 256,376.

*To all whom it may concern:*

Be it known that I, ARTHUR H. WOLFE, a citizen of the United States, residing at Massena, in the county of St. Lawrence and State of New York, have invented certain new and useful Improvements in Pipe-Nipples, of which the following is a specification.

This invention relates to water distribution and more particularly to a pipe nipple.

The primary object of this invention resides in the provision of a pipe nipple with which pipes of different diameters may be connected together.

A further object of this invention resides in the provision of a pipe nipple having both ends externally threaded for the connection of pipe sections of different diameters which are provided with unions having internally disposed threads.

With these and other objects in view this invention resides in certain novel features of construction which will be more fully set forth in the specification and pointed out in the appended claim, it being understood that the right is reserved to make such minor changes in construction as come within the scope of the appended claim.

In the accompanying drawing:—

Figure 1:
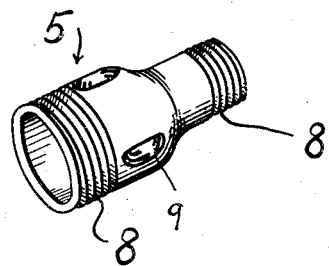
Figure 1 is a perspective view of a pipe nipple simply constructed in accordance with this invention.
Figure 2:
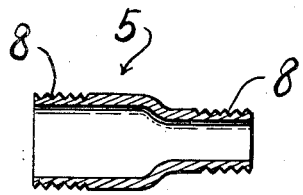
Fig. 2 is a longitudinal sectional view therethrough.

Referring more particularly to this invention, the numeral 5 designates a pipe nipple which is preferably made from a tubular sleeve by subjecting one end thereof to a stretching action to increase its diameter or if desired one end thereof may be subjected to a contracting action to decrease the diameter of a portion of said sleeve though it is not necessary to employ these methods as any approved method may be employed to successfully produce a nipple having its ends of different diameters.

The opposite ends of this nipple are externally threaded as at 8 for their engagement with pipes or unions that are provided with internal threads.

In order to obtain a secure grip on this nipple with a wrench lugs 9 are formed on the outer periphery thereof.

The nipple may have one end provided with a right hand thread and the other end provided with a left hand thread or if desired the threads may be both alike.

With this invention fully set forth it is manifest that a pipe nipple is produced which is cheap of manufacture and readily adapted for connecting pipes of different sizes.

Having thus described this invention what I claim is:

A pressed article of manufacture comprising a tubular sleeve having lugs formed on its outer periphery and its medial portion contracted with oppositely projecting extensions of uniform diameters throughout their lengths therefrom, said extensions having external threads at their ends and smooth and uninterrupted bores.

In testimony whereof I affix my signature.

ARTHUR HENRY WOLFE.